United States Patent
Brewer et al.

(10) Patent No.: US 11,418,450 B2
(45) Date of Patent: Aug. 16, 2022

(54) UPSTREAM CHANNELS FOR DISTRIBUTED CMTS

(71) Applicant: Alcatel-Lucent USA Inc., Murray Hill, NJ (US)

(72) Inventors: Keil Brewer, San Jose, CA (US); Rajamouli Gujjari, San Jose, CA (US); Philip Winterbottom, San Jose, CA (US)

(73) Assignee: VECIMA NETWORKS INC., Victoria (CA)

( * ) Notice: Subject to any disclaimer, the term of this patent is extended or adjusted under 35 U.S.C. 154(b) by 708 days.

(21) Appl. No.: 15/604,971

(22) Filed: May 25, 2017

(65) Prior Publication Data

US 2017/0346740 A1    Nov. 30, 2017

Related U.S. Application Data

(60) Provisional application No. 62/372,236, filed on Aug. 8, 2016, provisional application No. 62/342,730, filed on May 27, 2016.

(51) Int. Cl.
*H04L 47/10*     (2022.01)
*H04L 12/28*     (2006.01)
(Continued)

(52) U.S. Cl.
CPC .......... *H04L 47/15* (2013.01); *H04L 12/2856* (2013.01); *H04L 12/2865* (2013.01); *H04N 21/6168* (2013.01); *H04N 21/64738* (2013.01)

(58) Field of Classification Search
CPC ..... H04L 47/15; H04L 47/2441; H04L 47/34; H04L 47/10; H04L 47/20; H04L 47/24;
(Continued)

(56) References Cited

U.S. PATENT DOCUMENTS

| | | | |
|---|---|---|---|
| 6,693,878 B1 * | 2/2004 | Daruwalla | H04L 12/2801 370/235 |
| 7,349,430 B1 * | 3/2008 | Chapman | H04L 12/2801 370/390 |
| 7,443,873 B1 * | 10/2008 | Beser | H04N 7/17309 348/E7.07 |
| 8,908,518 B1 * | 12/2014 | Arnold | H04L 47/2408 370/235 |

(Continued)

FOREIGN PATENT DOCUMENTS

KR    1020080052162 A    6/2008

OTHER PUBLICATIONS

PCT/US2017/035002. Int'l Search Report & Written Opinion (dated Sep. 6, 2017).

*Primary Examiner* — Un C Cho
*Assistant Examiner* — Rasha K Fayed
(74) *Attorney, Agent, or Firm* — Loza & Loza, LLP; Jessica Smith

(57) ABSTRACT

A novel method of operating a Distributed Cable Modem Termination System is provided. Each branch CMTS node in a distributed CMTS supports a complete CMTS system and with full-spectrum ports. One or more MAC domains are defined at each branch CMTS node. A MAC domain defined at a branch CMTS node includes only service flows of the CMs that are connected to the branch CMTS node. Identifiers of service flows coming from a branch CMTS node are always unique, i.e., two different service flows of the branch CMTS would always have different SIDs, even if they belong to different MAC domains. On the other hand, service flows belonging to different branch CMTS nodes are free to reuse the same identifiers.

18 Claims, 6 Drawing Sheets

(51) Int. Cl.
*H04N 21/61* (2011.01)
*H04N 21/647* (2011.01)

(58) Field of Classification Search
CPC ..... H04L 47/2416; H04L 47/32; H04L 47/70; H04L 47/724; H04L 47/788; H04L 47/801; H04L 47/805; H04L 47/822; H04L 47/829; H04L 12/2865; H04L 12/2856; H04L 12/802; H04L 12/2801; H04L 12/56; H04L 12/287; H04L 12/2898; H04L 12/4641; H04L 12/2859; H04L 12/2876; H04L 49/90; H04L 49/9094; H04L 69/14; H04L 27/3416; H04L 45/00; H04L 45/50; H04L 41/0863; H04L 41/0886; H04L 41/12; H04Q 11/0071; H04Q 11/0067; H04Q 11/0478; H04N 7/17309; H04N 7/22; H04N 7/10; H04N 7/173; H04N 21/6168; H04N 21/64738; H04N 21/61; H04N 21/647; H04N 21/2221; H04N 21/6118
USPC ...................................... 370/432, 395.4, 437
See application file for complete search history.

(56) References Cited

U.S. PATENT DOCUMENTS

| | | | |
|---|---|---|---|
| 2002/0136203 A1* | 9/2002 | Liva | H04B 10/272 370/352 |
| 2003/0016692 A1* | 1/2003 | Thomas | H04J 14/0282 370/442 |
| 2005/0031097 A1* | 2/2005 | Rabenko | H04B 3/23 379/93.31 |
| 2006/0039380 A1* | 2/2006 | Cloonan | H04L 49/90 370/395.4 |
| 2006/0126506 A1* | 6/2006 | Denney | H04L 12/2801 370/229 |
| 2013/0003565 A1* | 1/2013 | Gotwals | H04B 17/309 370/248 |
| 2013/0265444 A1* | 10/2013 | Walsh | H04N 17/00 348/192 |
| 2014/0241377 A1* | 8/2014 | Pantelias | H04L 12/403 370/449 |
| 2015/0296057 A1* | 10/2015 | Ohana | H04L 69/324 370/437 |
| 2016/0197764 A1* | 7/2016 | Salinger | H04L 12/2801 370/401 |

* cited by examiner

UPSTREAM CHANNELS FOR DISTRIBUTED CMTS

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem and uses the cable modem to extract downstream DOCSIS digital data (frequently used for high-speed Internet), and inject upstream DOCSIS digital data (again, frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000BASE-LX10, 1000Base-BX10, and others. These networks and protocols are often referred to as GigE networks, which is an abbreviation of the Gigabit speeds and Ethernet protocols used for fiber based computer networks. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system to be further extended to meet the ever-growing demands for additional data.

SUMMARY

Some embodiments of the invention provide a distributed Cable Modem Termination System (CMTS) comprising a root CMTS node and a plurality of branch CMTS nodes for distributing downstream signals from the root CMTS node to a plurality of Cable Modems (CMs) and for relaying upstream signals from the plurality of CMs to the root CMTS node. Each branch CMTS node in some embodiments receives upstream signals from a corresponding set of CMs by using a set of physical upstream channels. A particular branch CMTS node provides a physical upstream channel that allows multiple different CMs to transmit upstream signals, wherein a first CM uses a first transmission opportunity of the physical upstream channel to transmit a first upstream signal for a first service flow and a second CM uses a second transmission opportunity of the physical upstream channel to transmit the second upstream signal for a second service flow.

In some embodiments, each CM receives downstream data of its service flows through downstream physical channels of its corresponding branch CMTS node and transmits upstream data of its service flows through upstream physical channels of its corresponding branch CMTS node. Some embodiments use a same physical upstream channel (e.g., the same frequency) to transmit upstream data for different service flows conducted by different CMs in order to fully utilize and conserve upstream bandwidth.

In some embodiments, each CM receives a set of allocation maps, each allocation map for defining a logical upstream channel. In some embodiments, each allocation map of a logical upstream channel includes an UCID for identifying the logical upstream channel and a set of information elements for defining the timing intervals of the various service flows. Each information element for a service flow includes a SID for identifying the service flow. A CM receiving an allocation map would therefore be able to identify its opportunities to transmit on a physical channel by identifying the SIDs in the allocation map that match the CM's service flows. In some embodiments, all CMs of a branch CMTS node are provided a common timing reference by the branch CMTS node so that the CMs are able to transmit upstream according to a common schedule defined by the allocation maps.

According to DOCSIS, a physical upstream channel is temporarily divided into multiple logical upstream channels. In some embodiments, each logical upstream channel is sub-divided into a set of timing intervals, where some of these timing intervals are assigned to carry upstream data for different service flows with different SIDs.

In some embodiments, each branch CMTS node in a distributed CMTS system supports a complete CMTS system with full-spectrum ports. In some of these embodiments, one or more MAC domains are defined at each branch CMTS node. A MAC domain defined at a branch CMTS node in some embodiments includes only service flows of the CMs that are connected to the branch CMTS node. In some embodiments, identifiers of service flows coming from a branch CMTS node are always unique, i.e., two different service flows of the branch CMTS would always have different SIDs, even if they belong to different MAC domains. In some embodiments, service flows belonging to different branch CMTS nodes are free to reuse the same SIDs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a distributed Cable Modem Termination System (CMTS) comprising a root CMTS node and a plurality of branch CMTS nodes for distributing downstream signals from the root CMTS node to a plurality of Cable Modems (CMs) and for relaying upstream signals from the plurality of CMs to the root CMTS node. Each branch CMTS node in some embodiments receives upstream signals from a corresponding set of CMs by using a set of physical upstream channels. A particular branch CMTS node provides a physical upstream channel that allows multiple different CMs to transmit upstream signals, wherein a first CM uses a first transmission opportunity of the physical upstream channel to transmit a first upstream signal for a first service flow and a second CM uses a second transmission opportunity of the physical upstream channel to transmit the second upstream signal for a second service flow.

In some embodiments, a distributed CMTS system is a virtualized CCAP (VCAP) system. Unlike a conventional CCAP (converged cable access platform) system in which the cable head end is a CMTS device that directly provides modulated RF signals through CATV cables to the cable modems, a VCAP system uses remote distribution nodes in the fields (remote from the central office) to handle all of the RF communications with cable modems in a distributed fashion. This leaves the central cable head end to be an all-IP/all-Ethernet hub, and the packet engine of the cable system is in some embodiments located at the cable head end for handling the IP/Ethernet traffic. Such a cable system is therefore also referred to as a distributed cable management system (DCMS). In some embodiments, the remote distribution nodes distribute the functionality of the CMTS device out into the field as if the line cards of the CMTS are remotely located in the individual neighborhoods so that the CATV cables need not run all the way to the cable head end to receive the cable RF signals. Consequently, the remote distribution nodes are also referred to as Cable Modem Remote Termination System (CMRTS) devices in some embodiments.

Figure 1:
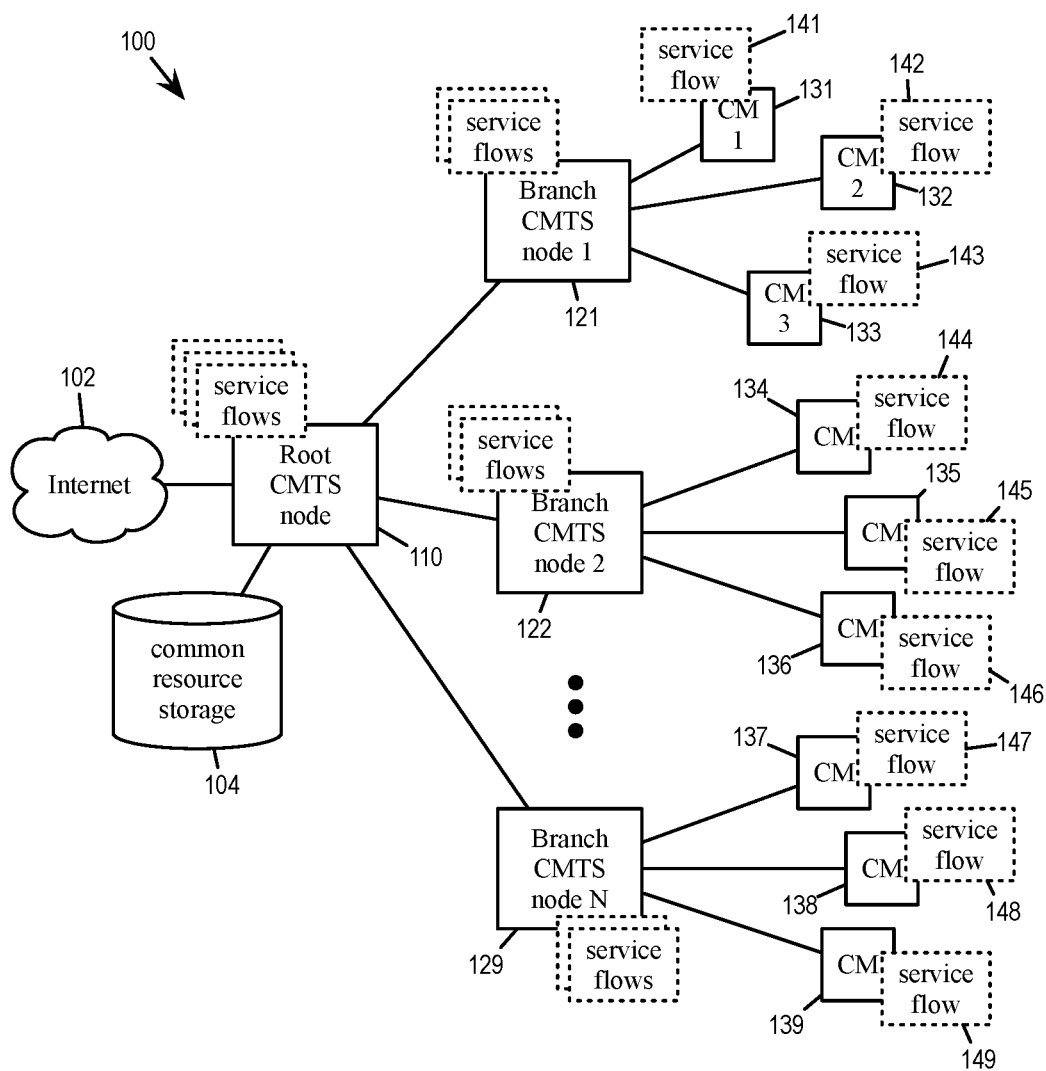
FIG. 1 illustrates a distributed CMTS system for some embodiments of the invention.

FIG. 1 illustrates a distributed CMTS system 100 for some embodiments of the invention. The distributed CMTS system provides services to CMs as service flows and allows different CMs to send upstream data belonging to different service flows through a same physical upstream channel provided by a branch CMTS node of the distributed CMTS system. As illustrated, the distributed CMTS system 100 includes a root CMTS node 110 and a set of branch CMTS nodes 121-129 for distributing downstream signals from the root CMTS node 110 to CMs 131-139 in the fields and for relaying upstream signals from the CMs 131-139 to the root CMTS node. Each of the branch CMTS nodes is in physical connection (e.g., through CATV cables) with a corresponding set of CMs. As illustrated, the branch CMTS node 121 is in connection with a set of CMs 131-133, the branch CMTS node 122 is in connection with a set of CMs 134-136, and the branch CMTS node 129 is in connection with a set of CMs 137-139. The CMs 131-139 are provided with service flows 141-149, respectively.

In some embodiments, the root CMTS node 110 is the headend of cable signal distribution system. In some embodiments, the headend is at a master facility for receiving television signals, Internet traffic, and other types of data for processing and distribution over a cable television (CATV) system. As illustrated, the root CMTS 110 has access to external data traffic 102 and common resource storage 104. The external data traffic 102 can include Internet, TV broadcast, as well as other media content from various content providers. The common resource storage 104 stores media content and other types of data locally at the cable headend. The root CMTS node receives data from the external data traffic 102 or the common resource storage 104 and distributes the received data as downstream data to the end users of the CMs 131-139. The root CMTS node also receives upstream data transmitted by the CMs 131-139 from end users. The received upstream data can be stored in the common resource storage 104 or injected into the external data traffic 102. This allows the cable system 100 to serve as an Internet service provider to its cable modem users.

The branch CMTS nodes 121-129 relay upstream and downstream data traffic between the root CMTS node 110 and the CMs 131-139. In some embodiments, at least some of the branch CMTS nodes are fiber nodes (FNs) that each communicates with the root CMTS node 110 through optical fiber, which supports high bandwidth digital traffic with the headend. Each FN/branch CMTS node in turn conducts data traffic with its corresponding set of CMs through CATV cables using RF (radio frequency) signals, some of which encoded into digital channels using QAM (quadrature amplitude modulation) or other formats. In some embodiments, the RF signals are divided in the frequency domain into a set of physical channels, some of which are downstream channels for delivering data to the CMs, some of which are upstream channels for receiving data from the CMs. In some embodiments, each physical upstream/downstream channel is a DOCSIS RF signal at a signal center frequency in an upstream/downstream carrier path.

In some embodiments, each branch CMTS node is a remote distribution node that is located in the fields away from the master facility of the cable headend or root CMTS node. Each branch CMTS node connects a set of neighborhood CATV cables for RF signal communication with a set of CMs that are physically in the vicinity of the branch CMTS node. These CMs are modems in user premises (houses, office, etc.) directly interfacing end-user devices such as TVs, computers, mobile phones, etc.

In some embodiments, each branch CMTS node is itself a complete CMTS system. Such a branch CMTS node comprises a set of physical RF ports for communicating with its corresponding set of CMs, where each of the physical RF ports is a full-spectrum DOCSIS port. In other words, the CMTS functionality of the system is distributed across branch CMTS nodes, and each of the CMs connecting a branch CMTS node is able to receive downstream signals in all DOCSIS specified downstream physical channels and to transmit upstream signals in all DOCSIS specified upstream physical channels. In some embodiments, each branch CMTS node has its own MAC layer and PHY layer (remote MAC and PHY) so it can conduct IP packet traffic directly with the root CMTS node, which in turn allows the branch CMTS node to provide full spectrum DOCSIS MAC processing.

The cable system 100 is for delivering a variety of data services through cable modems to each service nodes. These data services include cable set top box (STB), customer premise equipment (CPE), Voice over IP, multimedia terminal adapter (MTA), etc. In some embodiments, each of these data services is referred to as a cable service flow, as each of these data services requires a flow of data between the cable head end and a cable modem (illustrated as service flows in FIG. 1). It is also a unit that requests and consumes specific data (e.g., on-demand services), hence can also be referred to as a cable service-consuming unit.

In some embodiments, each CM receives downstream data of its service flows through downstream physical channels of its corresponding branch CMTS node and transmits upstream data of its service flows through upstream physical channels of its corresponding branch CMTS node. Some embodiments use a same physical upstream channel (e.g., the same frequency) to transmit upstream data for different service flows conducted by different CMs in order to fully utilize and conserve upstream bandwidth.

Figure 2:
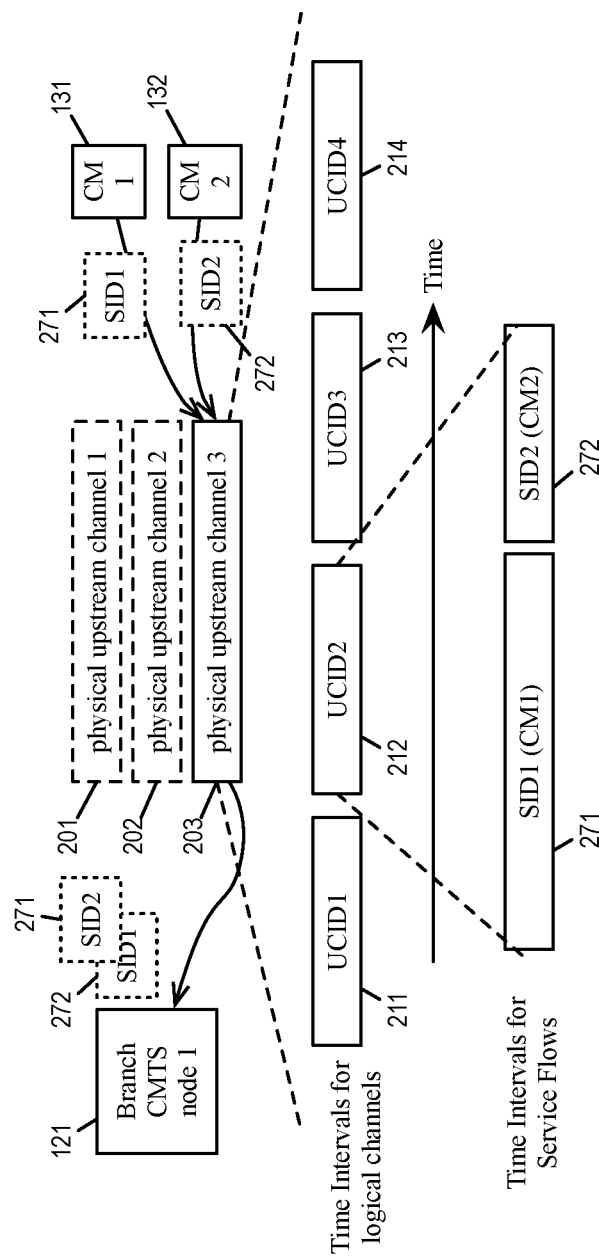
FIG. 2 illustrates a branch CMTS node allowing upstream data from different service flows of different CMs to use a same physical upstream channel to transmit data.

FIG. 2 illustrates a branch CMTS node allowing upstream data from different service flows of different CMs to use a same physical upstream channel to transmit data. As illustrated, the branch CMTS node 121 supports a set of physical upstream channels 201-203 for receiving upstream data from the CMs 131-133 through a neighborhood CATV cable 290. Each of the physical upstream channels is at a different signal center frequency. The CM 131 is sending upstream data for a service flow 271 and the CM 132 is sending upstream data for a service flow 272. The two different service flows from the two different CMs send their corresponding upstream data through the same physical channel 203 (physical upstream channel 3). In some embodiments, the usage of a physical upstream channel is time division multiplexed between different logical upstream channels and different service flows. The upstream data of the service flow 271 and the upstream data of the service flow 272 are assigned different timing intervals (referred to as opportunities for transmissions in some embodiments).

In some embodiments, each active service flow is assigned a service identifier (SID). (The service flow 271 is assigned identifier "SID1" and the service flow 272 is assigned identifier "SID2".) In some of these embodiments, the physical upstream channel is temporally divided into a set of timing intervals. Some of these timing intervals are assigned to carry upstream data for different service flows. Each timing intervals carrying upstream data for a service flow is identifiable by the SID of the service flow. In some embodiments, different service flows are guaranteed different SIDs regardless of the CM that is using the service flow, provided that the service flows are confined to those provided through a same branch CMTS node and MAC domain.

According to DOCSIS, a physical upstream channel is temporarily divided into multiple logical upstream channels. In some embodiments, each logical upstream channel is sub-divided into a set of timing intervals, where some of these timing intervals are assigned to carry upstream data for different service flows with different SIDs. In some embodiments, each logical upstream channel is associated with an upstream channel ID (UCID) in accordance with DOCSIS.

FIG. 2 also conceptually illustrates a physical channel that is temporally divided into timing intervals for carrying upstream data for different logical channels and different service flows. As illustrated, the physical channel 203 is temporally divided into logical upstream channels 211-214 (having UCIDs "UCID1", "UCID2", "UCID3", and "UCID4", respectively).

Some of these logical upstream channels are temporally divided into timing intervals, some of which are for carrying upstream data for different service flows from CMs. For example, the logical upstream channel 212 (with identifier "UCID2") is divided into several timing intervals, including a timing interval for carrying upstream data for the service flow 271 from the CM 131 (with identifier "SID1") and a timing interval for carrying upstream data for the service flow 272 from the CM 132 (with identifier "SID2"). Each timing interval for a service flow is therefore an opportunity for its CM to transmit on the physical upstream channel.

In some embodiments, each CM receives a set of allocation maps, each allocation map for defining a logical upstream channel. In some embodiments, each allocation map of a logical upstream channel includes an UCID for identifying the logical upstream channel and a set of information elements for defining the timing intervals of the various service flows. Each information element for a service flow includes a SID for identifying the service flow. A CM receiving an allocation map would therefore be able to identify its opportunities to transmit on a physical channel by identifying the SIDs in the allocation map that match the CM's service flows. In some embodiments, all CMs of a branch CMTS node are provided a common timing reference by the branch CMTS node so that the CMs are able to transmit upstream according to a common schedule defined by allocation maps.

Figure 3:
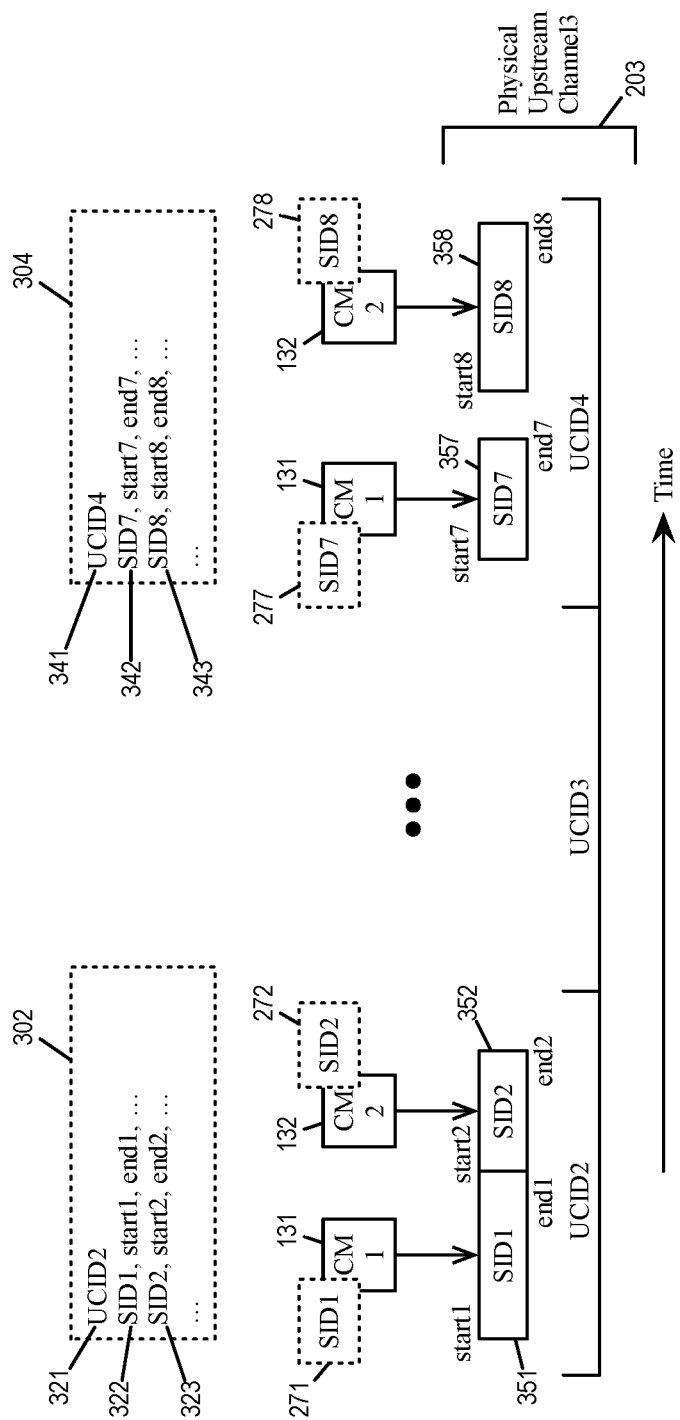
FIG. 3 illustrates how different CMs transmit data upstream according to a common schedule that is defined by allocation maps.

FIG. 3 illustrates how different CMs transmit data upstream according to a common schedule that is defined by allocation maps. The figure illustrates the upstream transmission on the physical upstream channel 203 by the CMs 131 and 132. The CMs 131 and 132 are scheduling their upstream transmissions according to allocation maps 302 and 304. The allocation map 302 is for defining the logical upstream channel 212 (upstream channel identifier "UCID2") and the allocation map 304 is for defining the logical upstream channel 214 (upstream channel identifier "UCID4"). Each of the CMs 131 and 132 had previously received the allocation maps 302 and 304 through one of the downstream channels (e.g., at the specified "primary" downstream channel of the CM as specified by DOCSIS).

In some embodiments, each allocation map includes an identifier for a logical upstream channel and a set of information elements. Each information element includes an identifier for a service flow (i.e., SID) and the start and end times of the timing interval for transmitting data for the service flow, which is specified in some embodiments in terms of a length and an offset relative to the allocation start time in the header of the allocation map. In some embodiments, the format of such allocation maps is defined according to DOCSIS.

As illustrated, the allocation map 302 includes upstream channel identifier 321 ("UCID2"), indicating that this is an allocation map for the logical upstream channel 212. The allocation map 302 also includes information elements 322 and 323. The information element 322 defines a timing interval 351 for the service flow with identifier "SID1", the timing interval having start time "start1" and end time "end1". The information element 323 defines a timing interval 352 for the service flow with identifier "SID2", the timing interval having start time "start2" and end time "end2". In some embodiments, the start times and end times are offset values that are stored as offset values referencing a timing reference that is common to all CMs of the branch CMTS node 121. In some embodiments, such a common timing reference is made available to the CMs as a time stamp. In some embodiments, the branch CMTS node delivers the synchronizing time stamps to all CMs connected to the branch CMTS node through a synchronization message (such as the SYNC message under DOCSIS). In some embodiments, this synchronization is distributed across different MAC domains of the branch CMTS node, as different MAC domains may operate using different clocks in some embodiments.

The allocation map 304 includes upstream channel identifier 324 ("UCID4"), indicating that this is an allocation map for the logical upstream channel 214. The allocation map 304 also includes information elements 342 and 343. The information element 342 defines a timing interval 357 for the service flow with identifier "SID7", the timing interval having start time "start7" and end time "end7". The information element 343 defines a timing interval 358 for the service flow with identifier "SID8", the timing interval having start time "start8" and end time "end8". In some embodiments, the start times and end times are stored as offset values referencing a timing reference that is common to all CMs of the branch CMTS node 121 (i.e., CMs 131-133). Some embodiments specify the start and end times of each timing interval as offsets that reference the start of the allocation map and a length of the timing interval.

The CM 131 is executing a service flow 271 with the SID "SID1" and a service flow 277 with the SID "SID7". The CM 131 would know when to transmit upstream data for the service flow 271 by using "SID1" to look up the start and end times of the information element 322 from the allocation map 302. The CM 131 would also know when to transmit upstream data for the service flow 277 by using "SID7" to look up the start and end times of the information element 342 from the allocation map 304.

The CM 132 is executing a service flow 272 with the SID "SID2" and a service flow 278 with the SID "SID8". The CM 132 would know when to transmit upstream data for the service flow 272 by using "SID2" to look up the start and end times of the information element 323 from the allocation map 302 and when to transmit upstream data for the service flow 278 by using "SID8" to look up the start and end times of the information element 343 from the allocation map 304.

Under DOCSIS, services provided to the users of CMs are organized into MAC domains. A MAC domain is a subcomponent of the CMTS that provides data forwarding services to a set of downstream and upstream channels. Traditionally, MAC domains are defined at the cable headend and applicable to all CMs of the system. However, DOCSIS assigns only 14 bits to represent each SID while there can be far more than 16384 service flows in the system. In order to accommodate more service flows and not be limited by the 14 bits assigned to represent SIDs, service flows belonging to different MAC domains are generally allowed to reuse the same identifiers. In other words, different service flows belonging to different MAC domains may have the same SID, i.e., different service flows belonging to different MAC domains are not guaranteed different SIDs.

As mentioned, a CM uses SID to identify timing intervals as opportunities to transmit upstream data of a corresponding service flow on a physical upstream channel. Consequently, different service flows cannot share a same physical upstream channel if they have the same SID, even if they are in different MAC domains. Such a limit reduces the available upstream bandwidth of a cable system by limiting the number of available unique SIDs that each upstream service group can have. (Each upstream service group defines the full set of upstream RF channels that a CM could physically use in a segment of the RF network, while each MAC domain has a subset service group called the MD-US-SG.)

It is worth noting that the system cannot eliminate the problem of non-unique SID by defining only one MAC domain. This is because many cable modems available on the market today limits each MAC domain to only 16 or 32 downstream channels, while the spectrum of a CMTS downstream RF transmitter/port generally supports 128 channels or more. Defining only one MAC domain would therefore waste much bandwidth at the branch CMTS node.

Instead of defining only one MAC domain or reusing SIDs between different MAC domains, some embodiments allow multiple MAC domains to be defined at a branch CMTS node while making sure that the identifiers of service flows coming from the branch CMTS node remain unique, i.e., two different service flows of the same branch CMTS would always have different SIDs, even if they belong to different MAC domains. On the other hand, service flows belonging to different branch CMTS nodes are free to reuse the same SIDs. This allows the bandwidth of each branch CMTS node to be fully utilized while still able to use limited number of bits per SID (14 bits) to address all of the possible service flows in the entire CMTS system. Such a system takes advantage of the fact that each branch CMTS node in a distributed CMTS supports a complete CMTS system with full-spectrum downstream ports so that service flows at different branch CMTS would not compete for the same upstream CATV bandwidth, regardless of the SIDs used.

In some embodiments, a MAC domain defined at a branch CMTS node includes only service flows of the CMs that are connected to the branch CMTS node. Each of such MAC domains only needs to support a limited number of service flows since the number of CMs connected to a branch CMTS node is usually limited (to users in one neighborhood vicinity).

There are also other justifications for using multiple MAC domains per branch CMTS, such as for other DOCSIS MAC layer services or IP layer services. For the latter, two MAC domains could be associated with different cable bundles in order to provide different IP address pools and routes.

In some embodiments, service flows are identified by SFIDs (Service Flow Identifiers) that are used to apply QoS in the data path for DOCSIS. A SID of a service flow is usually a different number from the service flow's SFID, but mostly overlapping ranges of SFIDs and SIDs are used for communication in the DOCSIS control path. Some embodiments perform a mapping from SFID to SID in order to enable upstream communication from the CMs. Some embodiments perform this mapping during provisioning of the corresponding service flow. These numbers can be, and in most integrated CMTS implementations, different. In some embodiments, the distributed nature of the architecture allows for enough SFID and SID reuse that these values can be identical.

Figure 4:
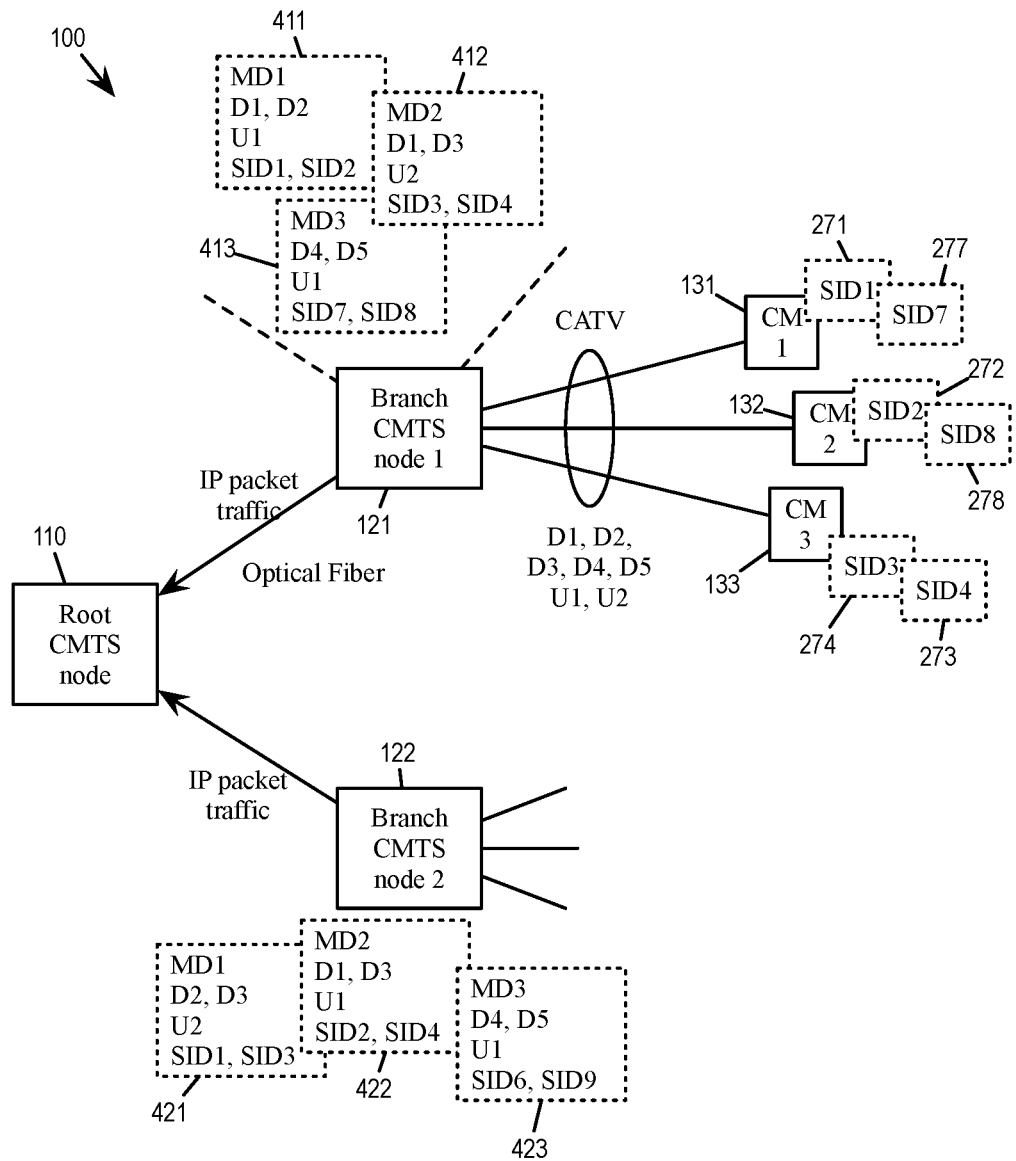
FIG. 4 illustrates MAC domains defined at the branch CMTS level, which allows unique SIDs among service flows coming from a branch CMTS node.

FIG. 4 illustrates MAC domains defined at the branch CMTS level, which allows unique SIDs among service flows coming from a branch CMTS node. The figure illustrates MAC domains defined by the branch CMTS nodes of the distributed CMTS system 100. As illustrated, the root CMTS node 110 of the system 100 is in IP packet communication (e.g., over optical fiber) with the branch CMTS node 121 and 122. The branch CMTS node 121 is in CMTS communications with the CMs 131-133. The CM 131 is using service flows 271 and 277 ("SID1" and "SID7"). The CM 132 is using service flows 272 and 278 ("SID2" and "SID8"). The CM 133 is using service flows 273 and 274 ("SID3" and "SID4").

The branch CMTS node 121 has several defined MAC domains 411-413 ("MD1", "MD2", and "MD3"). These MAC domains are applicable to the CMs 131-133 that are in CMTS communications with the branch CMTS node 121. Each of these MAC domains defines a set of (logical) upstream channels, a set of downstream channels, as well as a set of active service flows. Specifically, the MAC domain "MD1" (411) defines downstream channels "D1" and "D2", upstream channel "U1", and service flows "SID1" and "SID2", the MAC domain "MD2" (412) defines downstream channels "D1" and "D3", upstream channel "U2", and service flows "SID3" and "SID4", and the MAC domain "MD3" (413) defines downstream channels "D4" and "D5", upstream channel "U1", and service flows "SID7" and "SID8".

In some embodiments, each of these logical upstream channels has an associated allocation map for defining its usage in a physical upstream channel provided by the branch CMTS node 121. More importantly, all of the service flows defined by MAC domains 411-413 have SIDs that are unique across those different MAC domains. As illustrated, the MAC domain 411 has unique SIDs "SID1" and "SID2", the MAC domain 412 has unique SIDs "SID3" and "SID4", and the MAC domain 413 has unique SIDs "SID7" and "SID8". This enables sharing of any particular physical upstream channel by different service flows of different CMs at the branch CMTS node 121, even when those service flows belong to different MAC domains.

The branch CMTS node 122 also has its own defined MAC domains for its own connected CMs. Those MAC domains may have their own definition of upstream channels, downstream channels and service groups. Since each MAC domain is only confined to the CMs connected to a branch CMTS node (i.e., only to the CMs in the neighborhood of a fiber node), the number of CMs and service flows each MAC domain has to serve is limited. In some embodiments, the definition of MAC domains of one branch CMTS node would not interfere with the definition of MAC domains of another branch CMTS node. This is because the CMs of different branch CMTS node are not in CMTS communication with each other, and because the CMs of different branch CMTS nodes cannot share a same physical upstream channel. Therefore it doesn't matter if a service flow of the branch CMTS 121 use a same SID as a service flow of branch CMTS 122. As illustrated, the MAC domains 421-423 of the branch CMTS 122 uses SIDs "SID1", "SID3", "SID2", "SID4", "SID6", "SID9", several of which are also used by MAC domains 411-413 of the branch CMTS 121 (i.e., "SID1", "SID2", "SID3", "SID4").

Figure 5:
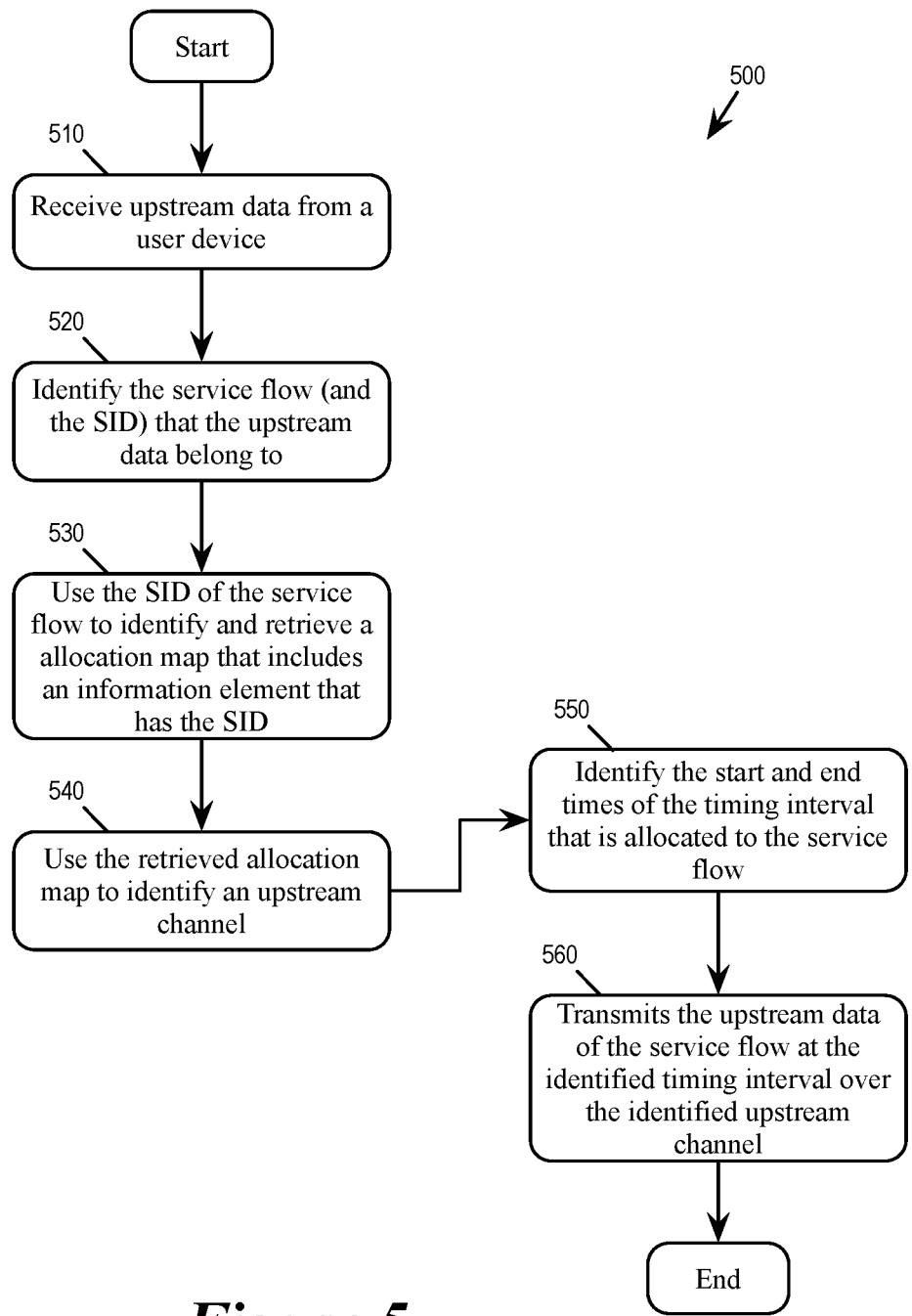
FIG. 5 conceptually illustrates a process for using unique SIDs to allow sharing of a physical upstream channel by different service flows from different CMs.

FIG. 5 conceptually illustrates a process 500 for using unique SIDs to allow sharing of a physical upstream channel by different service flows from different CMs. In some embodiments, a CM performs the process 500 when it sends upstream data to its branch CMTS node. The process 500 starts when it receives (at 510) upstream data (from a user device). The process then identifies (at 520) the service flow that the upstream data belongs to.

The process then identifies an upstream transmission opportunity for the service flow by using the corresponding SID. To do so, the process uses (at 530) the SID of the service flow to identify and retrieve an allocation map that includes an information element that has the SID. The process then uses (at 540) the retrieved allocation map to identify upstream channel that is to carry the upstream data for the service flow. The process also identifies (at 550) the start time and end time of the timing interval that is allocated to the service flow as an opportunity for the CM to transmit upstream over the identified upstream channel.

Next, the process transmits (at 560) the service flow's upstream data at the identified timing interval over the identified upstream channel. After transmitting the service flow's data upstream, the process 500 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic and/or solid state storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
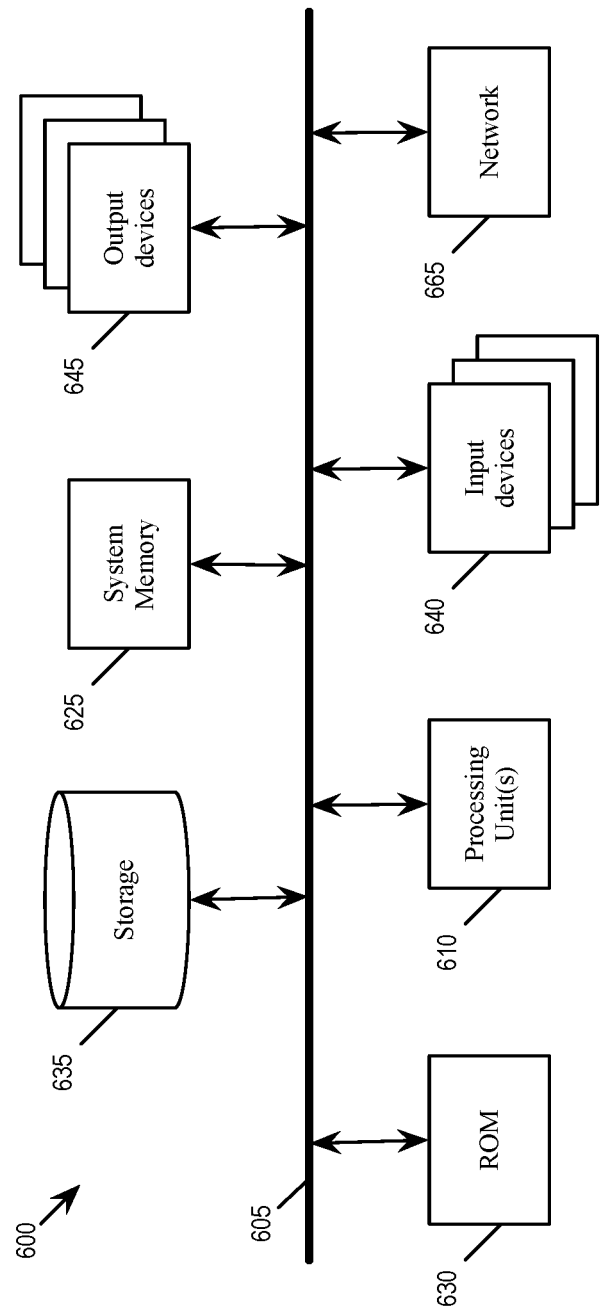
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieves instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A system comprising:
    a distributed CMTS comprising a root CMTS node and a plurality of branch CMTS nodes for distributing downstream signals from the root CMTS node to a plurality of CMs and for relaying upstream signals from the plurality of CMs to the root CMTS node;
    each branch CMTS node receiving upstream signals from a corresponding set of CMs by using a set of physical upstream channels,
    wherein a first CM transmits a first upstream signal having a first service flow identifier on a first physical upstream channel of a first branch CMTS node by using a first transmission opportunity that is identified by the first service flow identifier,
    wherein a second CM transmits a second upstream signal having a second service flow identifier on a second physical upstream channel of a second branch CMTS node by using a second transmission opportunity that is identified by the second service flow identifier,
    wherein the first service flow identifier of the first upstream signal and the second service flow identifier of the second upstream signal are identical.

2. The system of claim 1, wherein a third CM transmits a third upstream signal having a third service flow identifier on the first physical upstream channel of the first branch CMTS node by using a third transmission opportunity that is identified by the third service flow identifier, wherein the first and third service flow identifiers are different identifiers for identifying different transmission opportunities on the first physical upstream channel.

3. The system of claim 2, wherein the first physical upstream channel is temporally divided into a set of intervals comprising a first interval identified by the first service flow identifier as the first transmission opportunity and a second interval identified by the third service flow identifier as the third transmission opportunity.

4. The system of claim 1, wherein the first physical upstream channel is temporally divided according to a set of allocation maps, each allocation map defining a logical upstream channel, each allocation map referencing a common timing reference that is used by all CMs receiving downstream signals from the first branch CMTS node.

5. The system of claim 4, wherein the common timing reference is distributed by a DOCSIS SYNC message to all CMs receiving downstream signals from the first branch CMTS node.

6. The system of claim 1, wherein the first branch CMTS node provides a plurality of MAC domains for CMs connected to the first branch CMTS node.

7. The system of claim 6, wherein the first branch CMTS node provides a plurality of service flows through the plurality of MAC domains, wherein each service flow has a service flow identifier that is unique across the MAC domains of the first branch CMTS.

8. The system of claim 6, wherein the first MAC domain comprises a first set of logical upstream channels of the first branch CMTS node and the second MAC domain comprises a second set of logical channels of the first branch CMTS node.

9. The system of claim 8, wherein the first and second MAC domains do not comprise any physical upstream channels of any other branch CMTS node.

10. The system of claim 1, wherein each branch CMTS node comprises a set of physical RF ports for communicating with its corresponding set of CMs, wherein each of the physical RF ports is a full-spectrum DOCSIS port.

11. The system of claim 1, wherein each CMTS branch node distributes downstream signals through a plurality of physical downstream channels.

12. The system of claim 1, wherein each physical upstream channel is a DOCSIS RF signal at a signal center frequency in an upstream carrier path.

13. The system of claim 1, wherein each branch CMTS node is a fiber node (FN) and the root node is a cable head end.

14. A method comprising:
    at first branch CMTS node, sending an allocation map to a first CM and a second CM that are connected to the first branch CMTS node through a first CATV network, the allocation map specifying a first transmission opportunity for a first service flow from the first CM and second transmission opportunity for a second service flow from the second CM, wherein the first service flow is identified by a first service flow identifier and the second service flow is identified by a second service flow identifier, wherein the first and second service flow identifiers are different;
    receiving at a particular physical upstream channel upstream data for the first service flow during the first transmission opportunity from the first CM and upstream data for the second service flow during the second transmission opportunity from the second CM; and
    relaying the received upstream data for the first and second service flow to a root CMTS node that is connected to the first branch CMTS node and a second branch CMTS node through an optical fiber network, wherein the first service flow identifier is identical to a third service flow identifier for identifying a third service flow from a third CM that is connected to the second branch CMTS node through a second CATV cable network.

15. The method of claim 14, wherein the first service flow is associated with a first service flow identifier (SID) and the second service flow is associated with a second different SID.

16. The method of claim 14, wherein the physical upstream channel is temporally divided into a set of intervals comprising a first interval identified by the first SID as the first transmission opportunity and a second interval identified by the second SID as the second transmission opportunity.

17. The method of claim 16, wherein the physical upstream channel is temporally divided according to a set of allocation maps, each allocation map defining a logical upstream channel, each allocation map referencing a common timing reference that is used by all CMs receiving downstream signals from the particular branch CMTS node.

18. The method of claim 14, wherein the first service flow belongs to a first MAC domain and the second service flow belongs to a second MAC domain, wherein each service flow is assigned a unique SID that is different from all other service flows provided through the branch CMTS node.

\* \* \* \* \*